(12) United States Patent
Freimuth et al.

(10) Patent No.: US 10,581,680 B2
(45) Date of Patent: Mar. 3, 2020

(54) DYNAMIC CONFIGURATION OF NETWORK FEATURES

(71) Applicant: INTERNATIONAL BUSINESS MACHINES CORPORATION, Armonk, NY (US)

(72) Inventors: Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 14/952,437

(22) Filed: Nov. 25, 2015

(65) Prior Publication Data

US 2017/0149608 A1 May 25, 2017

(51) Int. Cl.
*H04L 12/24* (2006.01)
*H04L 12/26* (2006.01)
*H04L 12/801* (2013.01)

(52) U.S. Cl.
CPC ........ *H04L 41/0816* (2013.01); *H04L 41/083* (2013.01); *H04L 41/0823* (2013.01); *H04L 41/0826* (2013.01); *H04L 41/0896* (2013.01); *H04L 43/08* (2013.01); *H04L 47/11* (2013.01); *H04L 43/087* (2013.01); *H04L 43/0829* (2013.01); *H04L 43/0852* (2013.01)

(58) Field of Classification Search
None
See application file for complete search history.

(56) References Cited

U.S. PATENT DOCUMENTS 4,144,414 A 3/1979 Nicholas
5,689,508 A 11/1997 Lyles
(Continued)

FOREIGN PATENT DOCUMENTS

CN 103747023 A 4/2014
WO 2014021839 A1 2/2014

OTHER PUBLICATIONS

Office Action in U.S. Appl. No. 14/731,834, dated Apr. 19, 2017, pp. 1-22.
(Continued)

*Primary Examiner* — Angela Nguyen
(74) *Attorney, Agent, or Firm* — William Hartwell; Matthew M. Hulihan; Heslin Rothenberg Farley & Mesiti PC

(57) ABSTRACT

Dynamic configuration of network features is provided by performing real-time traffic analysis on network traffic flowing between an elastic cloud computing network and an edge appliance, evaluating effects of modifying elastic network bandwidth allocation and applying network traffic optimizations in routing traffic flowing between the elastic cloud computing network and the edge appliance, and dynamically configuring, based on the real-time traffic analysis and on the evaluating, one or more of (i) elastic network bandwidth allocation from the network service provider or (ii) at least one of the network traffic optimizations for performance by the edge appliance in routing traffic flowing between the elastic cloud computing network and the edge appliance.

20 Claims, 8 Drawing Sheets

(56) References Cited

U.S. PATENT DOCUMENTS

| | | | |
|---|---|---|---|
| 5,917,822 A | 6/1999 | Lyles et al. | |
| 6,118,764 A | 9/2000 | Depelteau et al. | |
| 6,205,477 B1 | 3/2001 | Johnson et al. | |
| 6,389,432 B1 | 5/2002 | Srinivas et al. | |
| 6,418,139 B1 | 7/2002 | Akhtar | |
| 6,438,581 B1 | 8/2002 | Neuhauser et al. | |
| 6,456,630 B1 | 9/2002 | Packer et al. | |
| 6,563,829 B1 | 5/2003 | Lyles et al. | |
| 6,594,279 B1 | 7/2003 | Nguyen et al. | |
| 6,738,348 B1* | 5/2004 | Rollins | H04L 12/14 370/230 |
| 6,788,646 B1 | 9/2004 | Fodor et al. | |
| 6,937,566 B1 | 8/2005 | Forslow | |
| 7,089,294 B1 | 8/2006 | Baskey et al. | |
| 7,103,906 B1* | 9/2006 | Katz | H04N 7/17318 348/E7.071 |
| 7,225,223 B1 | 5/2007 | McCarthy et al. | |
| 7,317,684 B2 | 1/2008 | Fodor et al. | |
| 7,542,420 B1 | 6/2009 | Mokhtar et al. | |
| 7,590,746 B2 | 9/2009 | Slater | |
| 7,685,310 B2 | 3/2010 | Ueoka et al. | |
| 7,808,918 B2 | 10/2010 | Bugenhagen | |
| 7,844,967 B2 | 11/2010 | Kelly | |
| 7,983,299 B1 | 7/2011 | Ma | |
| 8,412,824 B1 | 4/2013 | Schiff | |
| 8,464,335 B1 | 6/2013 | Sinha et al. | |
| 8,660,008 B2 | 2/2014 | Babiarz et al. | |
| 8,762,505 B2 | 6/2014 | Kutan et al. | |
| 8,767,547 B2 | 7/2014 | Adams | |
| 8,788,690 B2 | 7/2014 | Short et al. | |
| 8,793,343 B1 | 7/2014 | Sorenson, III et al. | |
| 8,799,320 B2 | 8/2014 | Chan et al. | |
| 8,873,753 B2 | 10/2014 | Parker | |
| 8,937,865 B1 | 1/2015 | Kumar et al. | |
| 9,026,671 B2 | 5/2015 | Gillies et al. | |
| 9,065,752 B2 | 6/2015 | Chetlur et al. | |
| 9,172,771 B1 | 10/2015 | Gross et al. | |
| 9,188,744 B1 | 11/2015 | Peng et al. | |
| 9,207,993 B2 | 12/2015 | Jain | |
| 9,330,156 B2 | 5/2016 | Satapathy | |
| 9,495,251 B2 | 11/2016 | Kottomtharayil | |
| 9,535,776 B2 | 1/2017 | Klose | |
| 9,596,144 B2 | 3/2017 | Anderson | |
| 10,148,579 B2 | 12/2018 | Adams | |
| 2002/0049841 A1 | 4/2002 | Johnson | |
| 2002/0101869 A1 | 8/2002 | Garcia-Luna-Aceves et al. | |
| 2002/0112113 A1 | 8/2002 | Karpoff et al. | |
| 2002/0124262 A1 | 9/2002 | Basso et al. | |
| 2002/0133613 A1 | 9/2002 | Teng et al. | |
| 2002/0144174 A1 | 10/2002 | Nwabueze | |
| 2002/0181394 A1 | 12/2002 | Partain et al. | |
| 2002/0194324 A1 | 12/2002 | Guha | |
| 2003/0021338 A1 | 1/2003 | Mazzoni | |
| 2003/0037061 A1 | 2/2003 | Sastri et al. | |
| 2003/0069963 A1 | 4/2003 | Jayant et al. | |
| 2003/0069972 A1 | 4/2003 | Yoshimura et al. | |
| 2003/0072327 A1 | 4/2003 | Fodor et al. | |
| 2003/0110263 A1 | 6/2003 | Shillo | |
| 2003/0120666 A1 | 6/2003 | Tacaille et al. | |
| 2003/0126132 A1 | 7/2003 | Kavuri et al. | |
| 2003/0142692 A1 | 7/2003 | Shimada | |
| 2003/0161300 A1 | 8/2003 | Malik | |
| 2003/0172130 A1 | 9/2003 | Fruchtman et al. | |
| 2003/0202477 A1 | 10/2003 | Zhen et al. | |
| 2004/0030620 A1 | 2/2004 | Benjamin et al. | |
| 2004/0098671 A1 | 5/2004 | Graham et al. | |
| 2004/0136379 A1 | 7/2004 | Liao et al. | |
| 2004/0198360 A1 | 10/2004 | Kotzin | |
| 2004/0199566 A1 | 10/2004 | Carlson et al. | |
| 2004/0215644 A1 | 10/2004 | Edwards, Jr. et al. | |
| 2004/0215749 A1 | 10/2004 | Tsao | |
| 2004/0246972 A1 | 12/2004 | Wang et al. | |
| 2004/0267897 A1 | 12/2004 | Hill et al. | |
| 2005/0033935 A1 | 2/2005 | Manbert et al. | |
| 2005/0125593 A1 | 6/2005 | Karpoff et al. | |
| 2005/0129000 A1 | 6/2005 | Sivakumar et al. | |
| 2005/0154841 A1 | 7/2005 | Sastri et al. | |
| 2005/0262509 A1 | 11/2005 | Kelly | |
| 2005/0027345 A1 | 12/2005 | Clark et al. | |
| 2005/0289618 A1 | 12/2005 | Hardin | |
| 2006/0039381 A1 | 2/2006 | Anschutz et al. | |
| 2006/0120282 A1 | 6/2006 | Carlson et al. | |
| 2006/0129562 A1 | 6/2006 | Pulamarasetti et al. | |
| 2006/0153070 A1 | 7/2006 | DelRegno et al. | |
| 2006/0171390 A1 | 8/2006 | LaJoie | |
| 2006/0206682 A1 | 9/2006 | Manbert et al. | |
| 2006/0209856 A1 | 9/2006 | Tojo et al. | |
| 2006/0218369 A1 | 9/2006 | Fujino | |
| 2006/0248231 A1 | 11/2006 | O'Rourke et al. | |
| 2006/0265558 A1 | 11/2006 | Fujino | |
| 2007/0022264 A1 | 1/2007 | Bromling et al. | |
| 2007/0065078 A1 | 3/2007 | Jiang | |
| 2007/0106798 A1 | 5/2007 | Masumitsu | |
| 2007/0195765 A1 | 8/2007 | Heissenbuttel et al. | |
| 2007/0198627 A1 | 8/2007 | Bozionek et al. | |
| 2008/0109450 A1 | 5/2008 | Clark et al. | |
| 2008/0115144 A1 | 5/2008 | Tsao | |
| 2008/0126525 A1 | 5/2008 | Ueoka et al. | |
| 2008/0140850 A1 | 6/2008 | Gade et al. | |
| 2008/0189718 A1 | 8/2008 | Gulley et al. | |
| 2008/0259798 A1 | 10/2008 | Loh | |
| 2008/0320097 A1 | 12/2008 | Sawicki et al. | |
| 2009/0007199 A1 | 1/2009 | JaJoie | |
| 2009/0061853 A1 | 3/2009 | Anschutz | |
| 2009/0100163 A1 | 4/2009 | Tsao | |
| 2009/0172782 A1 | 7/2009 | Taglienti et al. | |
| 2009/0187668 A1 | 7/2009 | Arendt et al. | |
| 2009/0204711 A1* | 8/2009 | Binyamin | H04L 67/16 709/226 |
| 2009/0217326 A1 | 8/2009 | Hasek | |
| 2009/0240867 A1 | 9/2009 | Shibayama et al. | |
| 2009/0271589 A1 | 10/2009 | Karpoff et al. | |
| 2010/0118883 A1 | 5/2010 | Jones et al. | |
| 2010/0257602 A1 | 10/2010 | Kettler et al. | |
| 2010/0268632 A1 | 10/2010 | Rosenthal | |
| 2010/0274656 A1 | 10/2010 | Genschel | |
| 2010/0306382 A1 | 12/2010 | Cardosa | |
| 2010/0306445 A1 | 12/2010 | Dake | |
| 2010/0332401 A1 | 12/2010 | Prahlad et al. | |
| 2011/0004550 A1 | 1/2011 | Giordano et al. | |
| 2011/0022697 A1 | 1/2011 | Huh | |
| 2011/0078227 A1 | 3/2011 | McAloon et al. | |
| 2011/0083037 A1 | 4/2011 | Bocharov et al. | |
| 2011/0125889 A1 | 5/2011 | Tsao | |
| 2011/0149972 A1 | 6/2011 | Hori et al. | |
| 2011/0158653 A1 | 6/2011 | Mazed | |
| 2011/0208710 A1 | 8/2011 | Lesavich | |
| 2011/0218770 A1 | 9/2011 | Li | |
| 2011/0282928 A1 | 11/2011 | Ball et al. | |
| 2011/0293278 A1 | 12/2011 | Mazed | |
| 2012/0023545 A1 | 1/2012 | Qu | |
| 2012/0063353 A1 | 3/2012 | Schlenk | |
| 2012/0072600 A1 | 3/2012 | Richardson et al. | |
| 2012/0109705 A1 | 5/2012 | Belady et al. | |
| 2012/0131309 A1 | 5/2012 | Johnson | |
| 2012/0137173 A1 | 5/2012 | Burshan et al. | |
| 2012/0180080 A1 | 7/2012 | LaJoie | |
| 2012/0201130 A1 | 8/2012 | Liv et al. | |
| 2012/0210381 A1 | 8/2012 | Ozawa | |
| 2012/0216259 A1 | 8/2012 | Okamoto et al. | |
| 2012/0246638 A1 | 9/2012 | He et al. | |
| 2012/0275428 A1 | 11/2012 | Feng et al. | |
| 2012/0331221 A1 | 12/2012 | Cho | |
| 2013/0003538 A1 | 1/2013 | Greenberg et al. | |
| 2013/0007254 A1 | 1/2013 | Fries | |
| 2013/0031258 A1 | 1/2013 | Mukai et al. | |
| 2013/0081014 A1 | 3/2013 | Kadatch | |
| 2013/0117766 A1 | 5/2013 | Bax et al. | |
| 2013/0121268 A1 | 5/2013 | Li et al. | |
| 2013/0136101 A1 | 5/2013 | Guo | |
| 2013/0185404 A1 | 7/2013 | Patel et al. | |
| 2013/0204963 A1 | 8/2013 | Boss et al. | |
| 2013/0205002 A1 | 8/2013 | Wang et al. | |
| 2013/0212282 A1 | 8/2013 | Puller | |

(56) References Cited

U.S. PATENT DOCUMENTS

| | | |
|---|---|---|
| 2013/0212422 A1 | 8/2013 | Bauer et al. |
| 2013/0227009 A1 | 8/2013 | Padmanaban et al. |
| 2013/0242903 A1 | 9/2013 | Narkar |
| 2013/0254383 A1 | 9/2013 | Wray |
| 2013/0254407 A1 | 9/2013 | Pijewski |
| 2013/0268672 A1 | 10/2013 | Justafort |
| 2013/0268799 A1 | 10/2013 | Mestery et al. |
| 2013/0282795 A1 | 10/2013 | Tsao |
| 2014/0040343 A1 | 2/2014 | Nickolov et al. |
| 2014/0056371 A1 | 2/2014 | Ji et al. |
| 2014/0057592 A1 | 2/2014 | Chetlur |
| 2014/0068076 A1 | 3/2014 | Dasher et al. |
| 2014/0075029 A1 | 3/2014 | Lipchuk |
| 2014/0082301 A1 | 3/2014 | Barton et al. |
| 2014/0082681 A1 | 3/2014 | Brown et al. |
| 2014/0089510 A1 | 3/2014 | Hao et al. |
| 2014/0098685 A1 | 4/2014 | Shattil |
| 2014/0101316 A1 | 4/2014 | Lee et al. |
| 2014/0115189 A1 | 4/2014 | Ao et al. |
| 2014/0129819 A1 | 5/2014 | Huang et al. |
| 2014/0164641 A1 | 6/2014 | Ye et al. |
| 2014/0180664 A1 | 6/2014 | Kochunni et al. |
| 2014/0188801 A1 | 7/2014 | Ramakrishnan et al. |
| 2014/0207968 A1 | 7/2014 | Kumar et al. |
| 2014/0233587 A1 | 8/2014 | Liv et al. |
| 2014/0244835 A1* | 8/2014 | Lopez Alvarez ... H04L 41/5067 709/224 |
| 2014/0258535 A1 | 9/2014 | Zhang |
| 2014/0281015 A1 | 9/2014 | Orona et al. |
| 2014/0289205 A1 | 9/2014 | Soichi |
| 2014/0344879 A1 | 11/2014 | Phillips et al. |
| 2014/0365658 A1 | 12/2014 | Lang et al. |
| 2015/0006614 A1 | 1/2015 | Suryanarayanan |
| 2015/0019740 A1 | 1/2015 | Zhao |
| 2015/0026793 A1* | 1/2015 | Li ............ H04L 63/0281 726/12 |
| 2015/0046960 A1 | 2/2015 | Hardin |
| 2015/0067093 A1 | 3/2015 | Sawicki et al. |
| 2015/0067744 A1 | 3/2015 | Furtwangler |
| 2015/0082362 A1 | 3/2015 | Hasek |
| 2015/0092590 A1 | 4/2015 | Zhu et al. |
| 2015/0117198 A1 | 4/2015 | Menezes et al. |
| 2015/0127805 A1 | 5/2015 | Htay et al. |
| 2015/0134731 A1 | 5/2015 | Wang et al. |
| 2015/0134830 A1 | 5/2015 | Popa |
| 2015/0156204 A1 | 6/2015 | Resch |
| 2015/0172070 A1 | 6/2015 | Csaszar |
| 2015/0195173 A1 | 7/2015 | Gupta et al. |
| 2015/0222445 A1 | 8/2015 | Iyer et al. |
| 2015/0234636 A1* | 8/2015 | Barnes, Jr. ............ G06F 3/167 715/728 |
| 2015/0235308 A1 | 8/2015 | Mick et al. |
| 2015/0256654 A1 | 9/2015 | Oguchi |
| 2015/0288919 A1* | 10/2015 | Labosco ............ H04N 19/44 348/445 |
| 2015/0339169 A1 | 11/2015 | Siddiqui et al. |
| 2016/0066261 A1 | 3/2016 | Nasielski et al. |
| 2016/0110132 A1 | 4/2016 | Wei et al. |
| 2016/0112327 A1 | 4/2016 | Morris et al. |
| 2016/0156538 A1 | 6/2016 | Yalagandula et al. |
| 2016/0197835 A1 | 7/2016 | Luft |
| 2016/0197848 A1 | 7/2016 | Bhide |
| 2016/0212063 A1 | 7/2016 | Calvo |
| 2016/0231948 A1 | 8/2016 | Gupta et al. |
| 2016/0256775 A1 | 9/2016 | Gustafson et al. |
| 2016/0277468 A1 | 9/2016 | Rodbro et al. |
| 2016/0316379 A1 | 10/2016 | Ottur et al. |
| 2017/0076057 A1 | 3/2017 | Burton |
| 2017/0090773 A1 | 3/2017 | Vijayan |
| 2017/0093639 A1 | 3/2017 | Dabbagh |
| 2017/0099211 A1 | 4/2017 | Iovanna et al. |
| 2018/0062943 A1 | 3/2018 | Djukic et al. |

OTHER PUBLICATIONS

Office Action in U.S. Appl. No. 14/952,466, dated Jun. 26, 2017, pp. 1-35.

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

XRoads Networks, "Dynamic Bandwidth Management", retrieved from internet Nov. 11, 2014, http://dualwanfirewalls.com/ubm/solutions/dynamic_bandwidth_control.xrn, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Notice of Allowance in U.S. Appl. No. 14/952,456, dated Sep. 15, 2017, pp. 1-14.

Office Action in U.S. Appl. No. 14/952,469, dated Oct. 3, 2017, pp. 1-51.

List of IBM Patents or Patent Applications Treated as Related, Dec. 14, 2017, pp. 1-2.

Elali, H., San Zone Reuse in Port Allocation, https://coprhd.atlassian.net/wiki/spaces/COP/pages/8618000/SAN+Zone+Reuse+in+Port+Allocation, Oct. 15, 2015 (6 pages).

Office Action in U.S. Appl. No. 14/952,449, dated Jul. 25, 2017, pp. 1-41.

Office Action in U.S. Appl. No. 14/952,456, dated May 17, 2017, pp. 1-25.

Office Action in U.S. Appl. No. 14/952,463, dated May 22, 2017, pp. 1-27.

* cited by examiner

DYNAMIC CONFIGURATION OF NETWORK FEATURES

BACKGROUND

Aspects described herein relate to configuration of network features, including features of a network offering elastic bandwidth allocation capabilities. Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

Meanwhile, network edge appliances, such as customer premise equipment, has traditionally been static equipment providing fixed functionality, and therefore flexibility in the equipment and its functioning was hindered.

SUMMARY

Shortcomings of the prior art are overcome and additional advantages are provided through the provision of a computer-implemented method that includes performing, by an edge appliance configured to access an elastic cloud computing network, real-time traffic analysis on network traffic flowing between the elastic cloud computing network and the edge appliance, the real-time traffic analysis comprising analysis of application data transported as part of the network traffic; evaluating an effect of modifying elastic network bandwidth allocation from a network service provider of the elastic cloud computing network, and an effect of applying network traffic optimizations in routing traffic flowing between the elastic cloud computing network and the edge appliance; and dynamically configuring, based on the real-time traffic analysis and on the evaluating, one or more of (i) elastic network bandwidth allocation from the network service provider or (ii) at least one network traffic optimization, of the network traffic optimizations, for performance by the edge appliance in routing traffic flowing between the elastic cloud computing network and the edge appliance.

Further, a computer program product including a computer readable storage medium readable by a processor and storing instructions for execution by the processor is provided for performing a method that includes: performing real-time traffic analysis on network traffic flowing between an elastic cloud computing network and an edge appliance configured to access the elastic cloud computing network, the real-time traffic analysis comprising analysis of application data transported as part of the network traffic; evaluating an effect of modifying elastic network bandwidth allocation from a network service provider of the elastic cloud computing network, and an effect of applying network traffic optimizations in routing traffic flowing between the elastic cloud computing network and the edge appliance; and dynamically configuring, based on the real-time traffic analysis and on the evaluating, one or more of (i) elastic network bandwidth allocation from the network service provider or (ii) at least one network traffic optimization, of the network traffic optimizations, for performance by the edge appliance in routing traffic flowing between the elastic cloud computing network and the edge appliance.

Yet further, a computer system is provided that includes a memory and a processor in communications with the memory, wherein the computer system is configured to perform a method including: performing real-time traffic analysis on network traffic flowing between an elastic cloud computing network and an edge appliance configured to access the elastic cloud computing network, the real-time traffic analysis comprising analysis of application data transported as part of the network traffic; evaluating an effect of modifying elastic network bandwidth allocation from a network service provider of the elastic cloud computing network, and an effect of applying network traffic optimizations in routing traffic flowing between the elastic cloud computing network and the edge appliance; and dynamically configuring, based on the real-time traffic analysis and on the evaluating, one or more of (i) elastic network bandwidth allocation from the network service provider or (ii) at least one network traffic optimization, of the network traffic optimizations, for performance by the edge appliance in routing traffic flowing between the elastic cloud computing network and the edge appliance.

Aspects of the above have advantages in that dynamic configuration and control of network features including elastic network bandwidth allocation and network traffic optimizations is provided to yield an optimized set of network feature configurations. Decisions are made in real-time about the dynamic configurations and can be made on an application-by-application basis.

The evaluating the effect of modifying the elastic network bandwidth allocation can include a consideration of bandwidth costs for different available bandwidth levels at different times of day, which has an advantage of enabling the system to determine how to minimize bandwidth costs by tailoring bandwidth levels for the different times of day.

The evaluating the effect of applying network traffic optimizations can include evaluating an effect of applying TCP optimization, including local acknowledgements of traffic receipt, and an effect of applying data compression. The dynamically configuring can include dynamically configuring the at least one network traffic optimization, the at least one network traffic optimization including one or more of the TCP optimization or the data compression. By considering both of these options (and possibly others), different possibilities are advantageously considered for the optimization(s) to put in place.

Evaluating the effect of applying the data compression can include a consideration of one or more of data rate or amount of time to compress data. This can inform whether it would be efficient to implement data compression given the latency added in doing so.

The application data may be exchanged as part of several distinct application data flows for several applications, where the real-time traffic analysis can include applying analytics against the several distinct application data flows in the network traffic flowing between the elastic cloud computing network and the edge appliance, and where the dynamically configuring can include determining one or more of the several distinct application data flows that would benefit from optimization and applying the one or more of TCP optimization or data compression to the one or more of the several distinct application data flows. This has an advantage of allowing network features to be adjusted on a per-application-flow basis, where particular configurations apply to particular application flows.

The dynamically configuring may be performed according to edge appliance policies configured by a user, the edge appliance policies setting parameters on determinations to configure the elastic network bandwidth allocation and the network traffic optimizations. This has an advantage of enabling users to apply prioritizations, thresholds, and the like in dictating when network features are to be adjusted and the adjustments to make for those features.

The performing real-time traffic analysis, the evaluating, and the dynamically configuring may be delivered as one or more virtualized processes executing on the edge appliance, which has an advantage of providing flexibility and re-configurability at the edge appliance rather than relying on static devices.

The performing real-time traffic analysis and the evaluating may be repeated periodically or aperiodically to dynamically determine and apply reconfigurations of one or more of the elastic network bandwidth allocation or network traffic optimization. The repeating has an advantage of providing for ongoing dynamic, real-time, automated adjustments to network features.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein leverage elastic network technologies that provide for dynamic provisioning of wide area network bandwidth and transfer capability between sites. More particularly, aspects described herein facilitate dynamic configuration and control of network features including elastic network bandwidth allocation and network traffic optimizations to yield an optimized set of network feature configurations. The effects of elastic network bandwidth allocation modifications (bandwidth amount and timing of allocation) and different traffic optimizations, such as TCP optimization and network packet data compression, are evaluated and may be dynamically configured where appropriate in order to promote efficiency and minimize costs.

Figure 1:
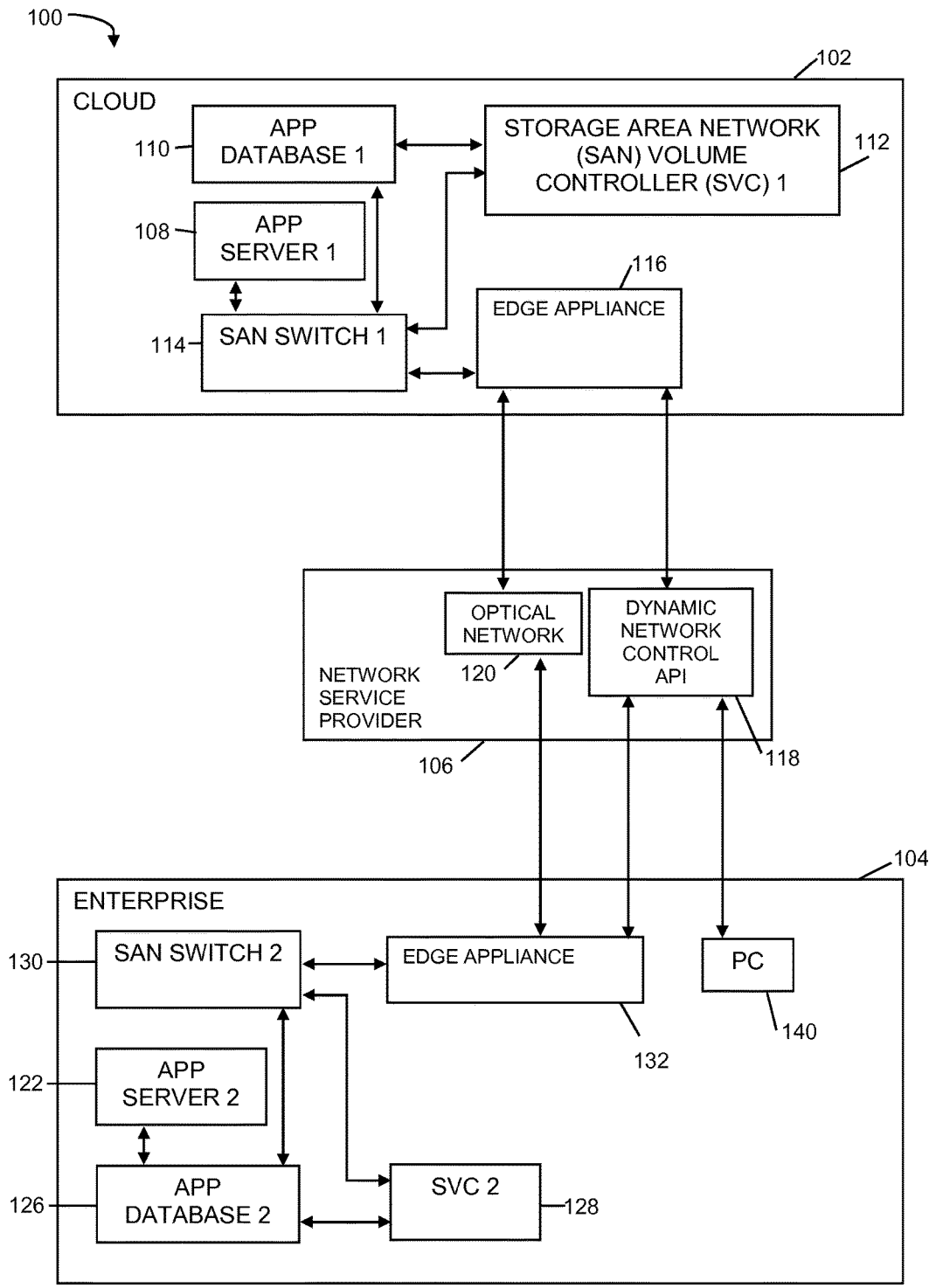
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider 106 providing an elastic cloud computing network. In one embodiment, network service provider 106 provides a programmable WAN that is used for the data transfer.

First site 102 includes a first application server 108 (i.e. a computer) hosting one or more applications, a first application database 110, a first storage area network (SAN) volume controller (SVC) 112 (i.e., a first storage resource), a first SAN switch 114 and a first edge appliance 116, which may be a router or other edge device, for example. In one embodiment, application server 108 or SVC 112 runs a data replication application that replicates data in first application database 110 from first SVC 112 via first SAN switch 114 and first edge appliance 116.

Management of elastic network bandwidth allocation is provided in the environment. A feature of the environment 100 is that one or more processes can determine and inform a dynamic network control application programming interface (API) 118 of the network service provider about when and how much bandwidth of an elastic cloud computing network 120 should be allocated for transfer of data, which transfer may utilize a dedicated channel to the second site 104 via network 120. In this example, network 120 is an optical network provided by network service provider 106. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first SAN switch 114 and first edge appliance 116 to the MPLS network.

Dynamic network control API 118 is executed, in one example, by a transport device (not shown), that is managed by network service provider 106. Dynamic network control API 118 allows first SVC 112, second SVC 128, an edge appliance (116, 132), a PC 140, or any other component at site 102, 104, or another site to dynamically change bandwidth allocation from network service provider 106. This is leveraged in accordance with aspects described herein to optimize bandwidth allocation and usage, and therefore decrease the cost associated with transferring data using that bandwidth.

Second site 104 can include components similar to those of first site 102. Thus, in this example, second site similarly includes a second application server 122 (i.e., a computer), second application database 126, second SVC 128 (i.e., a second storage resource), second SAN switch 130, and a second edge appliance 132. In one embodiment, data is transferred from first site 102 to second site 104, i.e. from first SVC 112 via first SAN switch 114 and first edge appliance 116 over optical network 120 to second SVC 128 via second edge appliance 132 and second SAN switch 130. Data may be transferred similarly from second site 104 to first site 102.

Example edge appliances 116 and/or 132 include customer premise equipment (CPE), which may or may not be provided, owned, and/or managed by a provider of telecommunications services, e.g. network service provider 106, to sites 102 and 104. As noted previously, CPE has traditionally been static equipment providing fixed functionality. This hinders flexibility in the equipment and its functioning.

In accordance with aspects described herein, edge appliances such as CPE provide not only functionality for dynamic bandwidth control but also virtualized and programmable additional functions described herein to facilitate transfer of data and routing of traffic between the edge appliances and elastic networks. This can be leveraged to advantageously reduce or minimize bandwidth costs for data transfer.

Network bandwidth is controlled to optimize bandwidth use, lower bandwidth costs, and enhance productivity in terms of data transfer. This is done at least in part based on leveraging facilities disposed within edge appliance(s), such as CPE. As an example, edge appliance 132 in FIG. 1 is (or provides) at least one virtualized entity on which traffic analysis, firewall, routing engine, bandwidth control, and/or data compression functionality is provided. An edge appliance according to aspects described herein can control the network bandwidth allocation and/or other traffic optimizations (TCP optimization, data compression) based on traffic conditions as assessed by the traffic analysis functionality. Bandwidth allocation can be modified based on bandwidth cost influenced by parameters such as time of day, duration of allocation, and other parameters.

The added flexibility of an elastic network advantageously allows processes described herein to consider potential bandwidth modifications and whether, based on some parameters, it would be most beneficial to dynamically provision additional bandwidth and/or implement network traffic optimizations, such as data compression or TCP optimizations. These dynamic configurations may be performed according to CPE policies specified by administrators or users that guide the determination about whether to invoke optimizations and/or change elastic bandwidth capability.

In a specific example, traffic analysis assesses data rates of application-specific traffic to determine whether one or more adjustments are to be made. If data rate is below a threshold, allocation of additional bandwidth, application of TCP optimizations, and compression of data each offer a potential to improve data rate. However, it may be best (most cost-efficient while keeping with quality of service specifications) to invoke only one such change instead of all of them. The edge appliance can include facilities for both evaluating the effects of modifying bandwidth allocation and applying network traffic optimization(s), and for dynamically configuring the bandwidth allocation and/or network traffic optimizations, if it is determined that one or more are to be applied.

In the specific example of FIG. 1, which is presented by way of example and not limitation, second site 104 is an enterprise site connected first site 102, a cloud site, via network service provider 106, which provides an elastic network and supports dynamic adjustment to the bandwidth provisioned to the sites.

Edge appliance 132 (e.g. CPE) of enterprise site 104 is, in one example, owned or provided by network service provider 106, and in another example provided by another entity, such as another cloud services provider. CPE 132 includes virtualized processes for firewall, routing, bandwidth control, data compression, and traffic analysis. CPE 132 also includes CPE policies defined by a user directly or via another component, such as PC 140.

Dynamic bandwidth control functionality of CPE 132 configures elastic network bandwidth allocation via API 118. Input from the traffic analyzer component of CPE 132 is used in conjunction with the CPE policies to control one or more of bandwidth or traffic optimizations.

Accordingly, performance and analysis capabilities are incorporated into customer premise virtual appliance(s) to exploit dynamic network capabilities, such as dynamic elastic network control and dynamically implemented traffic optimizations. Features include:
- dynamic traffic analysis used in virtualized network functions;
- dynamic requests for more or less bandwidth based on traffic data;
- traffic-based (rather than static-based) application of data compression;
- policy-driven determinations to use bandwidth and/or traffic optimizations based on parameters like time of day and cost; and
- customer provisioning capabilities to order and change features in real time.

In some examples, an edge appliance performs real-time traffic analysis on network traffic flowing between the elastic network and the edge appliance to determine one or more application data flows to which dynamic network configuration(s) are to be applied. The analysis can analyze the application data being transported as part of the network traffic, and more specifically as part of each distinct application flow, and also analyze the properties of the transfers of that application data, such as latency and other properties of the network traffic transporting the application data. Typical conventional routers focus on Internet Protocol (IP) header information to make routing decisions. Aspects described herein advantageously also examine application data payload (e.g. user data) to make optimization decisions. This also distinguishes from content-based routing that considers payload in the context determining a destination for the traffic, rather than determinations about optimization(s) to implement.

One type of dynamic network configuration is TCP optimization, which is an example network traffic optimization. Most applications rely on coordination through TCP-level responses. This works satisfactorily for some types of relatively short-session, interactive traffic. For other types of traffic, delay in receiving TCP-level responses has a significant impact on performance of the application because a lot of time is spent waiting for the responses to arrive. This is particularly detrimental to applications that rely on a significant amount of interaction. Some applications rely on hundreds of these line turnarounds for a single end user transaction, impacting the user's perception of performance when there is a wait for each response.

TCP optimization provides a local response. Referring to FIG. 1, when the enterprise application running on the application server 122 sends data out onto the network 120, the CPE provides a local response back to the application server 122 nearly immediately (a circuit with a 20 ms turnaround time because of latency might benefit from TCP optimization to provide a local response in 1 ms, for instance). Eventually, the cloud site issues some response that enters the CPE for handling, such as provision to the application server 122 or discard.

A CPE in accordance with aspects described herein analyzes network traffic flowing through the CPE to identify the distinct application flows, dynamically determines based on this analysis which application flow(s), if any, to optimize with TCP optimization, and automatically configures the TCP optimization for those application flow(s). TCP optimization configurations can be automatically and periodically, based on a policy, reexamined and adjusted if desired. This is in contrast to, and offers advantages over, a user/ administrator statically programming an optimization system to issue local responses based on user-recognized significant events.

Another form of network traffic optimization is data compression, which involves compressing data flowing across the CPE to reduce its size and therefore reduce total resources consumed in transferring the data. The data is decompressed on the receiving end. A cost of compressing/decompressing data is the additional time is takes to perform this processing, but the goal is for this added latency to cost less overall than transferring uncompressed data.

The real-time traffic analysis applied by the CPE as described herein can examine a plurality of application flows flowing through the CPE and use analytics to determine which (if any) of those flows would benefit from network traffic optimization—either TCP optimization and/or data compression in the examples described herein. Whether a particular transfer would benefit from network traffic optimization can consider the added cost of performing optimization against a measure of the cost associated with not invoking each optimization—for instance the cost of the latency in response time (when considering whether apply TCP optimization) or the cost of the added resource consumption to transfer uncompressed data (when considering whether to apply data compression). In addition, and based on that determination, the CPE can dynamically configure itself to perform TCP optimization and/or compression if it makes sense, in order to implement application flow optimization in real-time as the traffic flows over the network. Once an optimization is implemented, the application to the network traffic is accomplished via lower level analysis done packet-by-packet in real time to determine whether to send a response (in the case of TCP optimization) or compress/decompress the data of the packet (if data compression/decompression) is configured.

It is noted that the above functionality may be implemented at both ends of the traffic exchange, e.g. sites 102 and 104. In this regard, edge appliance 116 may incorporate the same or similar capabilities as described above with reference to edge appliance 132.

According to the above, real-time traffic analysis is used to evaluate the effects of implementing, removing, or tuning one or more network optimizations. There is an additional/alternative possibility of increasing/decreasing network bandwidth to address network throughput/efficiency. Like traffic optimizations, an increase in bandwidth can increases cost in one aspect (cost of additional bandwidth) but potentially decreases cost in another aspect (faster transfer times mean bandwidth is requested for a shorter duration of time). Thus, in addition to considering network traffic optimizations, an effect of modifying elastic network bandwidth allocation is also evaluated to determine whether it would be most cost effective to (at least temporarily) adjust bandwidth as an alternative to, or in conjunction with, an adjustment to network traffic optimization(s). It may be efficient to incur added costs of temporarily increasing bandwidth to complete a data transfer sooner, for instance, or it may be acceptable to increase latency by decreasing bandwidth if the cost saved by doing so outweighs the impact (if any) on application usage. As another example, data compression and/or TCP optimization may not sufficiently address a traffic concern, necessitating a bandwidth adjustment. Certain forms of traffic (some video files, voice data that is already compressed using a codec, encrypted data, unstructured data) may not compress well and therefore compression may not provide any benefit.

Accordingly, an optimum or desirable configuration across the available network traffic optimization(s) (on, off, and/or parameters tuned) and bandwidth level utilized for data transfer is sought. If during an off-peak period when bandwidth cost is lower, it may be more efficient to increase elastic bandwidth allocation instead of performing network traffic optimization(s) that add latency. The available configurations for each of these optimizations and bandwidth allocation (bandwidth levels and different times of day) may be periodically or aperiodically considered, and a set of configurations implemented. Traffic analysis is performed and decisions are made as to whether to apply zero or more of, e.g., TCP optimizations, data compression, or bandwidth allocation adjustment. Although it may be decided to not implement each or even any of these, at least an evaluation of each (e.g. the costs associated with each) is considered to determine the proper mix. More generally, the traffic is examined and the best method for utilizing the link is determined.

As noted above, some or all functioning of the CPE described herein may be implemented as virtualized processes rather than one or more discrete pieces of static equipment. This provides flexibly over conventional approaches. The functioning can be incorporated into common hardware serving as an edge appliance. Virtualizing these functions also provides flexibility for reconfiguration by PC 140 or another device. PC 140 may therefore be in communication with not only the network service provider 106 via API 118 to adjust bandwidth allocation in some examples, but also with CPE 132. PC 140 can also be used to set the CPE policy for controlling the network traffic and bandwidth optimizations described herein. The CPE policies can dictate the decision making about what traffic and bandwidth optimizations to apply to given circumstances. Different sites may have different priorities, capabilities, network fee schedules, and the like. One site might emphasize transfer speed in which increased bandwidth allocation is highly prioritized over network traffic optimization. Another site might be subject to very high bandwidth rates and therefore include policies that cap bandwidth at a given Mbps in favor of traffic optimizations. Policies can dictate optimizations based on thresholds, for example a policy can dictate that bandwidth is to be increased when the added cost falls below a particular cost per gigabit. The policies can be specified and modified by an administrator or user, as an example. Additionally or alternatively, a policy may be automatically tuned based on machine learning, for instance historical trends on bandwidth usage and bandwidth pricing, data compression ratios experienced for given types of data, or response times associated with TCP, as examples. In this manner, the appliance can train itself to recognize which optimizations/bandwidth levels are beneficial given the circumstances.

In some examples, the data being transferred from a site (102 or 104) is transferred to another site (102 or 104) as part of a backup or disaster recovery process. In other examples, the data being transferred from a site across the network is application traffic to one or more sites/destinations, though it is recognized that aspects described herein apply more generally to any type of traffic that traverses an elastic network.

Figure 2:
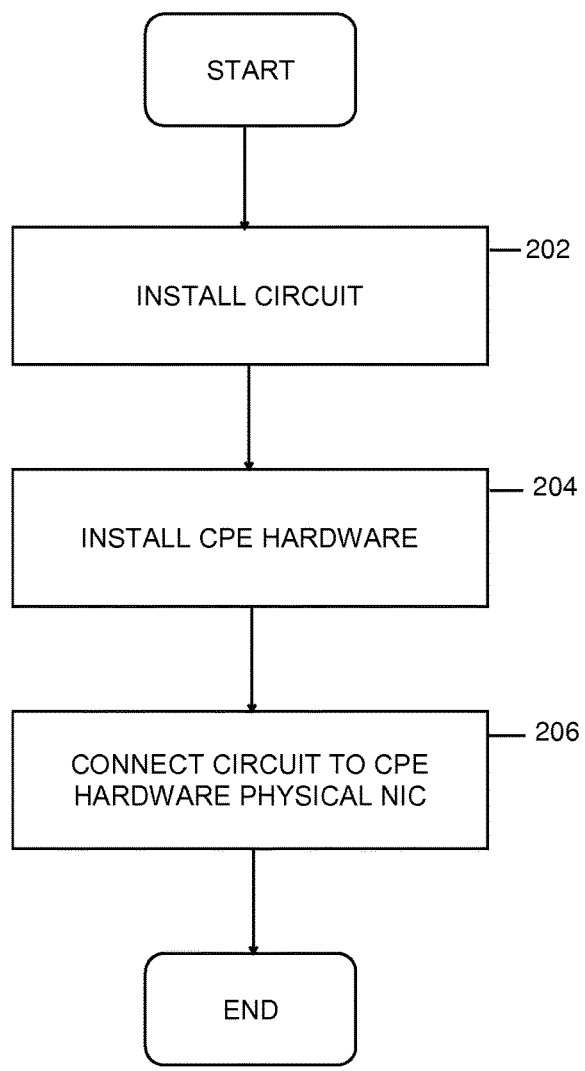
FIGS. 2-3 depict example processes for deploying customer premise equipment and associated functionality thereon, in accordance with aspects described herein.
Figure 3:
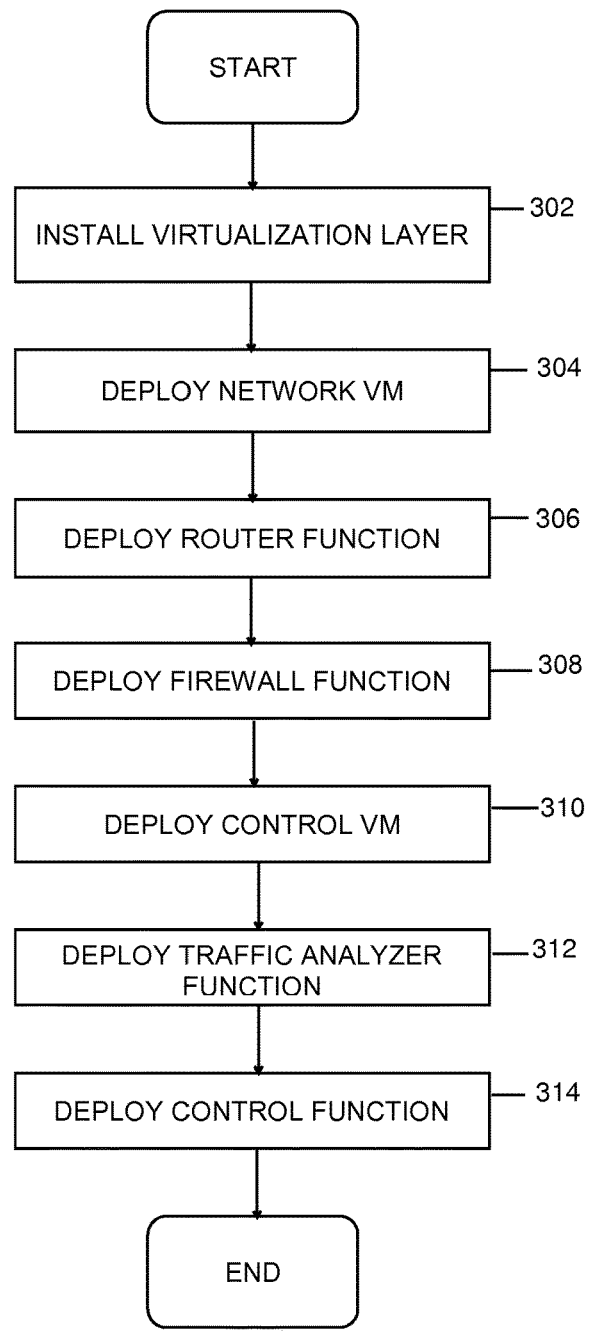

FIGS. 2-3 depict example processes for deploying customer premise equipment and associated functionality thereon, in accordance with aspects described herein.

FIGS. 2 and 3 depict example processes for deploying CPE hardware and software, respectively. Referring to FIG. 2, the physical aspects of the CPE are deployed by installing a circuit (202), referring to a physical connection to the elastic network, installing the CPE hardware (204), which provides the edge hardware for connecting the site to the network service provider and can perform processing described herein, and then coupling the circuit to the CPE hardware, e.g. a physical network interface card thereof (206).

Prior to or after deploying the CPE hardware, the CPE software is deployed, an example process for which is presented with reference to FIG. 3. A virtualization layer is installed (302) to provide an environment (e.g. virtual machine monitor or hypervisor) for supporting virtual machines, and one or more network virtual machine(s) are deployed on top of the virtualization layer (304). Providing virtual machines offers advantages including flexibility and reprogrammability in the functions offered. Router and firewall functions (e.g. virtualized processes) are then deployed (306, 308) in the one or more virtual machines and a control virtual machine is deployed (310). The router and firewall functions can perform common routing and firewall processes. Because they are virtualized, they are flexible in terms of their configuration. In an example, the control virtual machine runs a traffic analyzer function (FIG. 5) and/or control function (FIG. 4), which are deployed (312, 314) as, e.g., virtualized processes.

Figure 4:
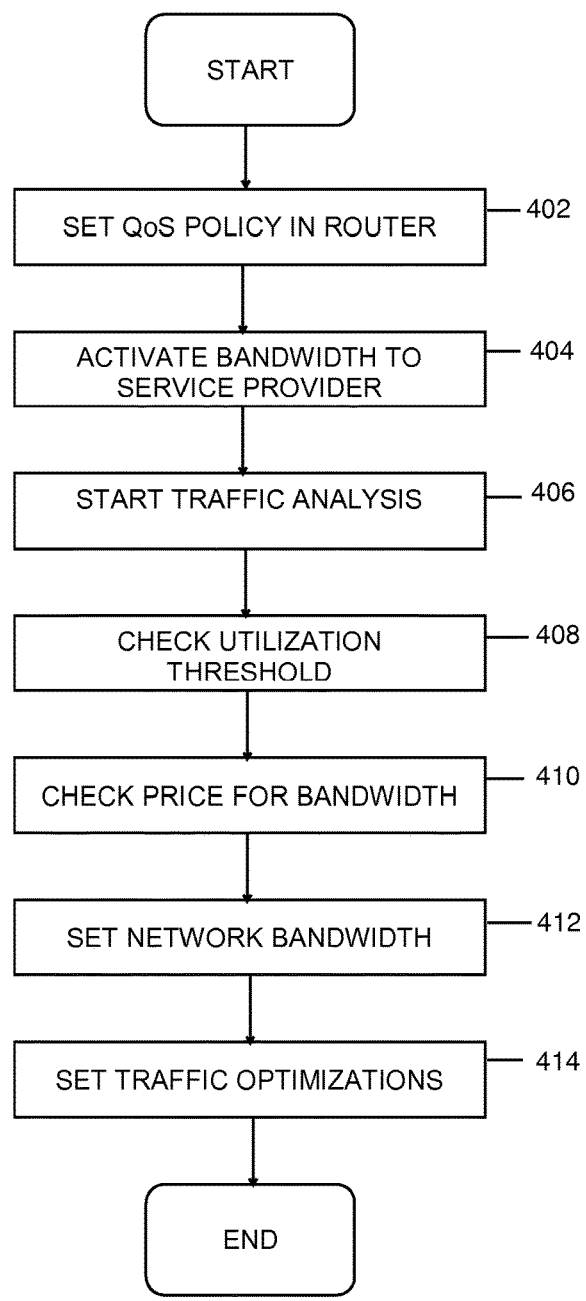
FIG. 4 depicts an example control process in accordance with aspects described herein.

FIG. 4 depicts an example control process in accordance with aspects described herein. The process may be run on the deployed control VM (FIG. 3, #310) in one example. The process begins, after registering with the network, with the control VM setting a quality of service (QoS) policy in the router function (402), which is an example CPE policy discussed above. The CPE policy can indicate priorities, thresholds, and the like that dictate optimizations to be put in place or removed and bandwidth levels to set, among other configurations, given sets of parameters that are reflective of the current circumstances of the network, traffic, timing, and other characteristics. The control VM then activates service provider bandwidth (404) and starts traffic analysis (406) for traffic flowing across the CPE from/to the network. The traffic analysis is performed by a traffic analyzer function, an example of which is described below with reference to FIG. 5. Based on the traffic analysis, the control VM checks utilization threshold (408) as well as price for bandwidth under different potential parameters, like different levels and times, (410). In this manner, bandwidth cost may be considered not only for the present time but also times in the future, for instance in order to potentially defer transfer of data until a future time when bandwidth costs less. Based on the above and on considerations of available network traffic optimizations and bandwidth allocation adjustments, the control VM sets network bandwidth and/or network traffic optimizations (412, 414) to optimize network feature utilization.

Figure 5:
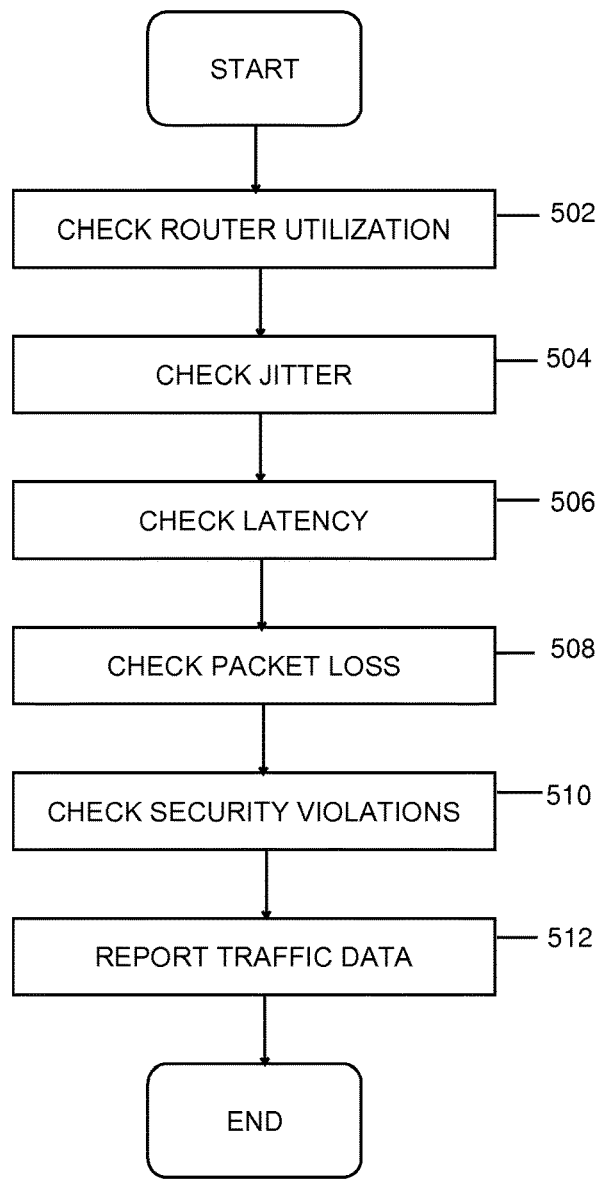
FIG. 5 depicts an example traffic analyzer process in accordance with aspects described herein.

An example of traffic analysis (FIG. 4 #406) is described with reference to FIG. 5, which is performed by the traffic analyzer function in this example. The traffic analyzer function checks/analyses several traffic characteristics, such as characteristics including, as examples, router utilization (502), jitter (504), latency (506), packet loss (508) and security violations (510). These characteristics may be examined to inform whether particular optimizations or bandwidth increases/decreases are beneficial or detrimental. As one example, high router utilization may suggest that traffic optimizations and/or data compression functions should not by enabled (or should be disabled if possible) to reduce demand on the router. High jitter and/or packet loss might suggest that it would be beneficial to compress data and send as fewer packets. High latency might suggest to increase bandwidth. Security violations can identify unauthorized outbound traffic, denial of service attacks, etc. to avoid abuse of the elastic bandwidth. Various other examples are possible. The traffic analyzer function then reports results (512) back to the control process (FIG. 4) for determining whether adjustments to traffic optimizations and/or bandwidth allocation are necessary and, if so, implementing them.

Figure 6:
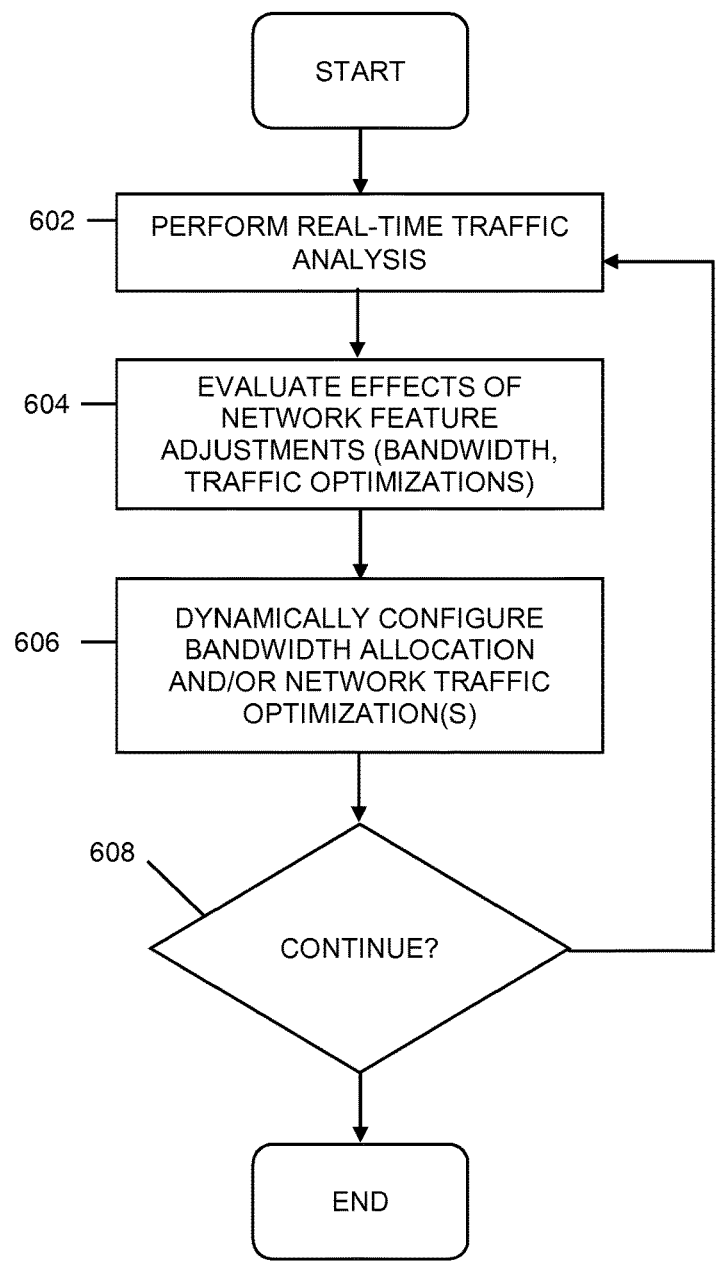
FIG. 6 depicts an example process for controlling network features to optimize network feature configuration, in accordance with aspects described herein.

FIG. 6 depicts an example process for controlling network features to optimize network feature configuration, in accordance with aspects described herein. In one example, the process is performed by an edge appliance, such as CPE. The process begins by the edge appliance, configured to access an elastic cloud computing network, performing real-time traffic analysis (602) on network traffic flowing between the elastic cloud computing network and the edge appliance. The traffic analysis analyzes for characteristics that inform whether traffic optimizations, data compression, and/or bandwidth changes (among possible other configurations) would be beneficial. Router utilization, jitter, latency, packet loss, and security violations are example characteristics. In addition, the real-time traffic analysis includes analysis of application data transported as part of the network traffic. The analysis of the application data is used to identify discrete application flows to enable fine-grained application of optimizations, bandwidth allocations, etc. to individual application flows (or optionally more generally to all application flows). This has an advantage of informing decisions in real-time about dynamic configurations that can be made on an application-by-application basis to the elastic network configuration.

The process continues with the edge appliance evaluating effect(s) of network feature adjustments (604), for instance an effect of modifying elastic network bandwidth allocation from a network service provider of the elastic cloud computing network, and an effect of applying network traffic optimizations in routing traffic flowing between the elastic cloud computing network and the edge appliance. Evaluating the effect of modifying the elastic network bandwidth allocation can include a consideration of bandwidth costs for different available bandwidth levels at different times of day. This can be used in conjunction with scheduling and other considerations to decide whether it would be advantageous to delay/schedule a transfer for a later time. There are tradeoffs between transferring at an earlier time (i.e. at a higher cost) versus transferring at a later time (i.e. off-peak, at a lower cost). Edge appliance policies can specify how those factors weigh against each other to inform the decision about what to do. This has an advantage of enabling the system to determine how to minimize bandwidth costs by tailoring bandwidth levels for the different times of day.

Evaluating the effect of applying network traffic optimizations can include evaluating an effect of applying the TCP optimization and an effect of applying the data compression. By considering both of these options (and possibly others), the process advantageously considers different possibilities for optimization(s) to put in place. In the specific example of evaluating the effect of applying the data compression, this can include a consideration of one or more of data rate or amount of time to compress data. This can inform whether it would be efficient to implement data compression given the latency added in doing so.

The process continues with the edge appliance dynamically configuring, based on the real-time traffic analysis and on the evaluating, one or more of (i) elastic network bandwidth allocation from the network service provider or (ii) at least one network traffic optimization, of the network traffic optimizations, for performance by the edge appliance in routing traffic flowing between the elastic cloud computing network and the edge appliance (606). Thus, one or more of the considered network feature adjustments are dynamically configured. In an example where the dynamically configuring includes dynamically configuring the elastic network bandwidth allocation, this configuring increases bandwidth of the elastic network. Additionally or alternatively, the dynamically configuring can include dynamically configuring the at least one network traffic optimization, including one or more of TCP optimization, including local acknowledgements of traffic receipt, or data compression.

As noted, the dynamically configuring can be performed according to edge appliance policies configured by a user and that set parameters on the determinations about whether to configure the elastic network bandwidth allocation and the network traffic optimizations. In this manner, users can advantageously apply prioritizations, thresholds, and the like in dictating when network features are to be adjusted and the adjustments to make for those features.

Periodically or aperiodically, the edge appliance can repeat the performing real-time traffic analysis and the evaluating to dynamically determine and apply reconfigurations of one or more of the elastic network bandwidth allocation or network traffic optimization. Thus, the edge appliance determines whether the process is to continue with such an iteration (608), and returns to 602 if so, otherwise the process ends. The repeating has an advantage of providing for ongoing dynamic, real-time, automated adjustments to network features.

In one embodiment, the application data is exchanged as part of several distinct application data flows for several applications and the real-time traffic analysis includes the edge appliance applying analytics against the several distinct application data flows in the network traffic flowing between the elastic cloud computing network and the edge appliance. In this manner, the traffic optimization(s) performed for one application flow may vary from the optimization(s) performed for another application flow. Thus, the dynamically configuring can include determining one or more of the several distinct application data flows that would benefit from optimization and applying the one or more of TCP optimization or data compression to the one or more of the several distinct application data flows. This advantageously allows network features to be adjusted on a per-application-flow basis, where particular configurations apply to particular application flows. A higher priority application flow can be given priority through adjustments being applied to traffic of that application flow, for example.

Performance of the real-time traffic analysis, the evaluating, and the dynamically configuring may be delivered as one or more virtualized processes executing on the edge appliance. This has an advantage of providing flexibility and re-configurability at the edge appliance rather than relying on static devices. In some examples, the edge appliance includes additional virtualized processes for firewall functionality and routing functionality.

Processes described herein may be performed singly or collectively by one or more computer systems, such as computer system(s) described below with reference to FIG. 7.

Figure 7:
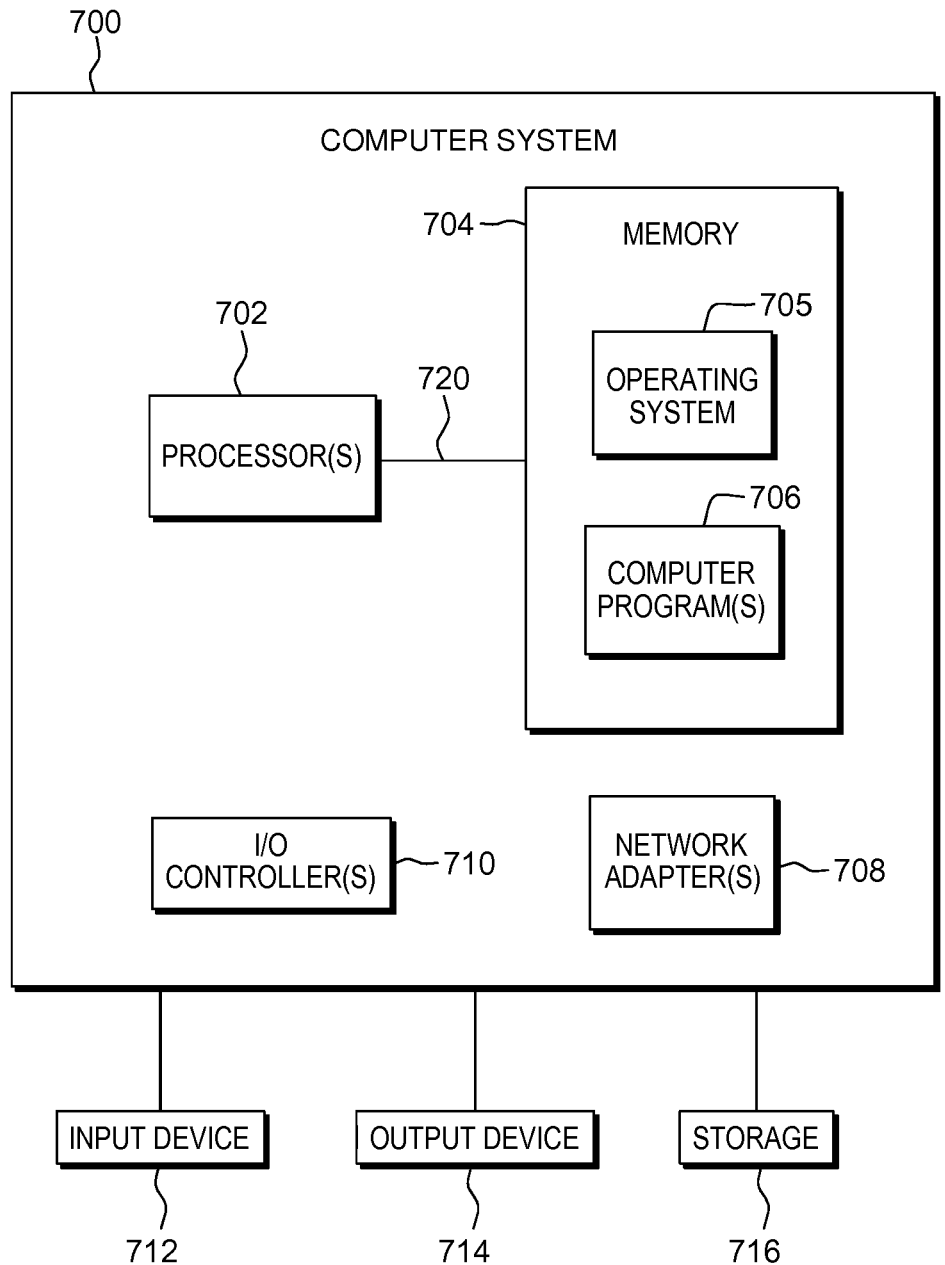
FIG. 7 depicts an example of a computer system to incorporate or use aspects described herein.

FIG. 7 depicts one example of a computer system to incorporate and use aspects described herein. A computer system may also be referred to herein as a processing device/system or computing device/system, or simply a computer. Computer system 700 may be based on one or more of various system architectures such as those offered by International Business Machines Corporation (Armonk, N.Y., USA) or Intel Corporation (Santa Clara, Calif., USA), as examples.

Computer system 700 is suitable for storing and/or executing program code and includes at least one processor 702 coupled directly or indirectly to memory 704 through, e.g., a system bus 720. In operation, processor(s) 702 obtain from memory 704 one or more instructions for execution by the processors. Memory 704 may include local memory employed during actual execution of the program code, bulk storage, and cache memories which provide temporary storage of at least some program code in order to reduce the number of times code must be retrieved from bulk storage during program code execution. A non-limiting list of examples of memory 704 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 704 includes an operating system 705 and one or more computer programs 706, for instance programs to perform aspects described herein.

Input/Output (I/O) devices 712, 714 (including but not limited to displays, microphones, speakers, accelerometers, gyroscopes, magnetometers, light sensors, proximity sensors, GPS devices, cameras, etc.) may be coupled to the system either directly or through I/O controllers 710.

Network adapters 708 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 708 used in computer system.

Computer system 700 may be coupled to storage 716 (e.g., a non-volatile storage area, such as magnetic disk drives, optical disk drives, a tape drive, etc.), having one or more databases. Storage 716 may include an internal storage device or an attached or network accessible storage. Computer programs in storage 716 may be loaded into memory 704 and executed by a processor 702 in a manner known in the art.

The computer system 700 may include fewer components than illustrated, additional components not illustrated herein, or some combination of the components illustrated and additional components. Computer system 700 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 8:
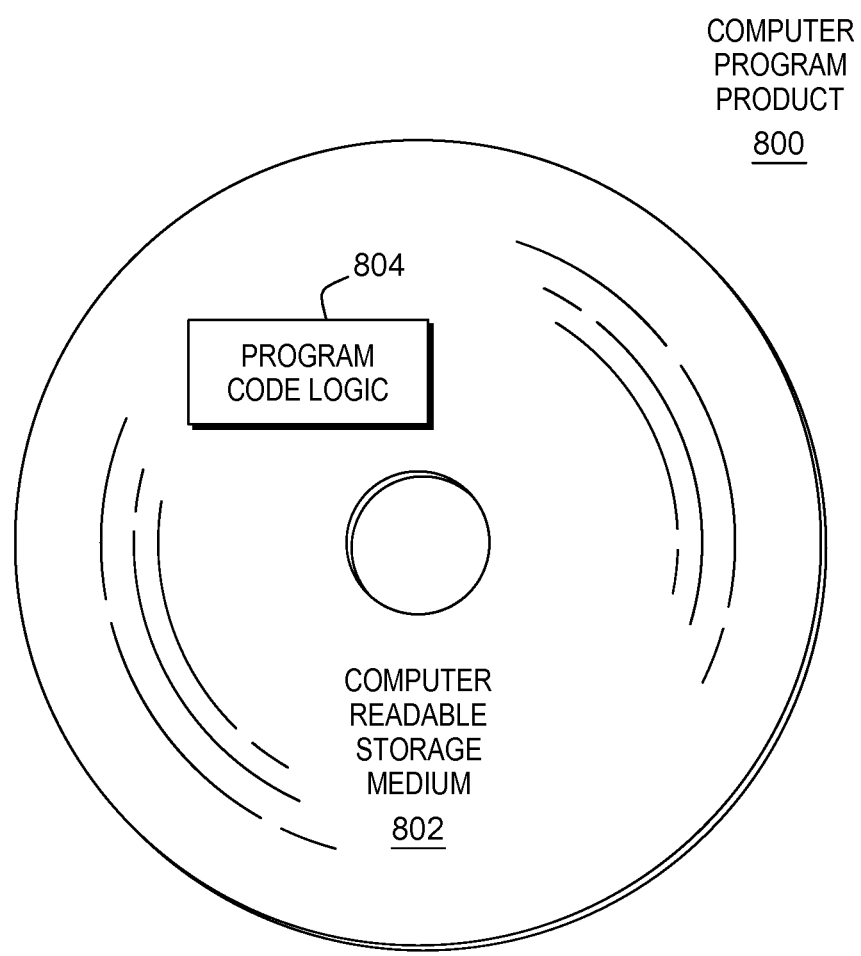
FIG. 8 depicts one embodiment of a computer program product.

Referring to FIG. 8, in one example, a computer program product 800 includes, for instance, one or more computer readable storage media 802 to store computer readable program code means, logic and/or instructions 804 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
performing, by an edge appliance in communication with an elastic cloud computing network across a network connection, real-time traffic analysis on network traffic flowing though the network connection between the elastic cloud computing network and the edge appliance as t appliance as the edge appliance and elastic cloud computing network communicate with each other through the network connection, the real-time traffic analysis comprising analysis of application data transported as part of the network traffic, wherein a network service provider of the elastic cloud computing network provides an initial allocated amount of elastic network bandwidth for the network connection between the edge appliance and the elastic cloud computing network;
evaluating an effect of modifying elastic network bandwidth allocation from the network service provider of the elastic cloud computing network to change the amount of elastic network bandwidth being provided by the network service provider for the network connection from the initial amount being provided to a different amount, and an effect of applying network traffic optimizations in routing traffic flowing between the elastic cloud computing network and the edge appliance; and
based on the real-time traffic analysis, the evaluating, and on comparing the effect of modifying elastic network bandwidth allocation from the network service provider with the effect of applying network traffic optimizations, dynamically configuring at least one selected from the group consisting of: (i) elastic network bandwidth allocation from the network service provider, and (ii) at least one network traffic optimization, of the network traffic optimizations, for performance by the edge appliance in routing traffic flowing between the elastic cloud computing network and the edge appliance.

2. The method of claim 1, wherein the evaluating the effect of modifying the elastic network bandwidth allocation comprises a consideration of bandwidth costs for different available bandwidth levels at different times of day.

3. The method of claim 1, wherein the dynamically configuring comprises dynamically configuring the at least one network traffic optimization, the at least one network traffic optimization comprising at least one selected from the group consisting of: (i) TCP optimization, including local acknowledgements of traffic receipt, and (ii) data compression.

4. The method of claim 1, wherein the dynamically configuring is performed according to edge appliance policies configured by a user, the edge appliance policies setting parameters on determinations to configure the elastic network bandwidth allocation and the network traffic optimizations.

5. The method of claim 1, wherein the performing real-time traffic analysis, the evaluating, and the dynamically configuring are delivered as one or more virtualized processes executing on the edge appliance.

6. The method of claim 1, wherein the application data is transported as part of application data flow traffic through the edge appliance to another device, the edge appliance sitting between the another device and the elastic cloud computing network in a communication path between the elastic cloud computing network and the another device.

7. The method of claim 2, wherein the dynamically configuring comprises dynamically configuring the elastic network bandwidth allocation to increase bandwidth of the elastic network.

8. The method of claim 3, wherein the evaluating the effect of applying network traffic optimizations comprises evaluating an effect of applying the TCP optimization and an effect of applying the data compression.

9. The method of claim 8, wherein the evaluating the effect of applying the data compression comprises a consideration of at least one selected from the group consisting of: (i) data rate, and (ii) amount of time to compress data.

10. The method of claim 3, wherein the application data is exchanged as part of several distinct application data flows for several applications, wherein the real-time traffic analysis comprises applying analytics against the several distinct application data flows in the network traffic flowing between the elastic cloud computing network and the edge appliance, and wherein the dynamically configuring comprises determining one or more of the several distinct application data flows that would benefit from optimization and applying the selected at least one of TCP optimization and the data compression to the one or more of the several distinct application data flows.

11. The method of claim 5, wherein the edge appliance comprises additional virtualized processes for firewall functionality and routing functionality.

12. A computer program product comprising:
a computer readable storage medium readable by a processor and storing instructions for execution by the processor for performing a method comprising:
performing real-time traffic analysis on network traffic flowing through a network connection between an elastic cloud computing network and an edge appliance, in communication with the elastic cloud computing network and configured to access the elastic cloud computing network, as the edge appliance and elastic cloud computing network communicate with each other through the network connection, the real-time traffic analysis comprising analysis of application data transported as part of the network traffic, wherein a network service provider of the elastic cloud computing network provides an initial allocated amount of elastic network bandwidth for the network connection between the edge appliance and the elastic cloud computing network;
evaluating an effect of modifying elastic network bandwidth allocation from the network service provider of the elastic cloud computing network to change the amount of elastic network bandwidth being provided by the network service provider for the network connection from the initial amount being provided to a different amount, and an effect of applying network traffic optimizations in routing traffic flowing between the elastic cloud computing network and the edge appliance; and based on the real-time traffic analysis, the evaluating, and on comparing the effect of modifying elastic network bandwidth allocation from the network service provider with the effect of applying network traffic optimizations, dynamically configuring at least one selected from the group consisting of: (i) elastic network bandwidth allocation from the network service provider, and (ii) at least one network traffic optimization, of the network traffic optimizations, for performance by the edge appliance in routing traffic flowing between the elastic cloud computing network and the edge appliance.

13. The computer program product of claim 12, wherein the evaluating the effect of modifying the elastic network bandwidth allocation comprises a consideration of bandwidth costs for different available bandwidth levels at different times of day, and wherein the dynamically configuring comprises dynamically configuring the elastic network bandwidth allocation to increase bandwidth of the elastic network.

14. The computer program product of claim 12, wherein the dynamically configuring comprises dynamically configuring the at least one network traffic optimization, the at least one network traffic optimization comprising at least one selected from the group consisting of: (i) TCP optimization, including local acknowledgements of traffic receipt, and (ii) data compression.

15. The computer program product of claim 12, wherein the performing real-time traffic analysis, the evaluating, and the dynamically configuring are delivered as one or more virtualized processes executing on the edge appliance.

16. The computer program product of claim 14, wherein the application data is exchanged as part of several distinct application data flows for several applications, wherein the real-time traffic analysis comprises applying analytics against the several distinct application data flows in the network traffic flowing between the elastic cloud computing network and the edge appliance, and wherein the dynamically configuring comprises determining one or more of the several distinct application data flows that would benefit from optimization and applying the selected at least one of the TCP optimization and the data compression to the one or more of the several distinct application data flows.

17. A computer system comprising:
a memory; and
a processor in communication with the memory, wherein the computer system is configured to perform a method, the method comprising:
performing real-time traffic analysis on network traffic flowing through a network connection between an elastic cloud computing network and an edge appliance, in communication with the elastic cloud computing network and configured to access the elastic cloud computing network, as the edge appliance and elastic cloud computing network communicate with each other through the network connection, the real-time traffic analysis comprising analysis of application data transported as part of the network traffic, wherein a network service provider of the elastic cloud computing network provides an initial allocated amount of elastic network bandwidth for the network connection between the edge appliance and the elastic cloud computing network;

evaluating an effect of modifying elastic network bandwidth allocation from the network service provider of the elastic cloud computing network to change the amount of elastic network bandwidth being provided by the network service provider for the network connection from the initial amount being provided to a different amount, and an effect of applying network traffic optimizations in routing traffic flowing between the elastic cloud computing network and the edge appliance; and based on the real-time traffic analysis, the evaluating, and on comparing the effect of modifying elastic network bandwidth allocation from the network service provider with the effect of applying network traffic optimizations, dynamically configuring at least one selected from the group consisting of; (i) elastic network bandwidth allocation from the network service provider, and (ii) at least one network traffic optimization, of the network traffic optimizations, for performance by the edge appliance in routing traffic flowing between the elastic cloud computing network and the edge appliance.

18. The computer system of claim 17, wherein the evaluating the effect of modifying the elastic network bandwidth allocation comprises a consideration of bandwidth costs for different available bandwidth levels at different times of day, and wherein the dynamically configuring comprises dynamically configuring the elastic network bandwidth allocation to increase bandwidth of the elastic network.

19. The computer system of claim 17, wherein the dynamically configuring comprises dynamically configuring the at least one network traffic optimization, the at least one network traffic optimization comprising at least one selected from the group consisting of: (i) TCP optimization, including local acknowledgements of traffic receipt, and (ii) data compression.

20. The computer system of claim 19, wherein the application data is exchanged as part of several distinct application data flows for several applications, wherein the real-time traffic analysis comprises applying analytics against the several distinct application data flows in the network traffic flowing between the elastic cloud computing network and the edge appliance, and wherein the dynamically configuring comprises determining one or more of the several distinct application data flows that would benefit from optimization and applying the selected at least one of the TCP optimization and the data compression to the one or more of the several distinct application data flows.

* * * * *